(12) United States Patent
Watanabe et al.

(10) Patent No.: US 8,391,869 B2
(45) Date of Patent: Mar. 5, 2013

(54) COMMUNICATION SYSTEM

(75) Inventors: Teruyoshi Watanabe, Kawasaki (JP);
Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 12/759,995

(22) Filed: Apr. 14, 2010

(65) Prior Publication Data
US 2010/0202410 A1 Aug. 12, 2010

Related U.S. Application Data

(63) Continuation of application No. PCT/JP2007/001251, filed on Nov. 19, 2007.

(51) Int. Cl.
*H04W 36/00* (2009.01)

(52) U.S. Cl. ..... 455/436; 455/442; 455/439; 455/422.1; 370/331; 370/329

(58) Field of Classification Search ....... 455/436–456.6, 455/439, 442, 422.1, 419, 420; 370/328–338
See application file for complete search history.

(56) References Cited

U.S. PATENT DOCUMENTS

| | | | |
|---|---|---|---|
| 6,628,632 B1 | 9/2003 | Dolan | |
| 2004/0184424 A1 | 9/2004 | Shibata et al. | |
| 2007/0167164 A1* | 7/2007 | Kirla | 455/436 |
| 2008/0167003 A1* | 7/2008 | Wang et al. | 455/411 |
| 2009/0047955 A1* | 2/2009 | Frenger et al. | 455/436 |

FOREIGN PATENT DOCUMENTS

| | | |
|---|---|---|
| CN | 1882175 A | 12/2006 |
| CN | 101035359 A | 9/2007 |
| JP | 11150753 | 6/1999 |
| JP | 2001258058 | 9/2001 |
| JP | 2003179616 | 6/2003 |
| JP | 2004282652 | 10/2004 |
| JP | 2004304394 A | 10/2004 |
| JP | 2007208595 | 8/2007 |
| KR | 20010021099 | 3/2001 |
| KR | 20070071317 A | 7/2007 |
| WO | 03055104 A1 | 7/2003 |
| WO | 2007100108 A1 | 9/2007 |

OTHER PUBLICATIONS

Korean Intellectual Property Office Notice of Preliminary Rejection dated Jul. 20, 2011 for application No. 10-2010-7010088.
3GPP TR 25.912 V7.1.0 (206-09) 3rd Generation Partnership Project; Technical Specification Group Radio Access Network; Feasibility study for evolved Universal Terrestrial Radio Access (UTRA) and Universal Terrestrial Radio Access Network (UTRAN) (Release 7) Retrieved on May 1, 2007.

(Continued)

*Primary Examiner* — Chuong A Ngo
(74) *Attorney, Agent, or Firm* — Smith, Gambrell & Russell, LLP

(57) ABSTRACT

A source eNB determines whether an X2 interface is established between the source eNB and a target eNB when the source eNB performs a handover of a UE under the control of the source eNB to the target eNB. When the X2 interface is not established between the source eNB and the target eNB, the source eNB inquires with an address management node about the IP address of the target eNB. Upon receipt of the IP address of the target eNB from the address management node, the source eNB accesses the target eNB using the IP address and establishes the X2 interface. After establishing the X2 interface, the source eNB performs a handover of the UE to the target eNB.

15 Claims, 22 Drawing Sheets

OTHER PUBLICATIONS

3GPP TS 25.331 V7.4.0 (Mar. 2007) 3rd Generation Partnership Project; Technical Specification Group Radio Access Network; Radio Resource Control (RRC); Protocol Specification (Release 7) Retrieved on May 29, 2007.

3GPP TR23.882 fD.3.5 3rd Generation Partnership Project; Technical Specification Group Services and System Aspects; 3GPP System Architecture Evolution: Report on Technical Options and Conclusions (Release 7) Retrieved on May 29, 2007.

3GPP R3-070695 TSG-RAN WG3 Meeting #55bis St.Julian, Malta, Mar. 27-30, 2007 Retrieved on May 29, 2007.

International Search Report dated Mar. 11, 2008 in corresponding International application No. PCT/JP2007/001251.

First Notification of Office Action received in China dated Jul. 13, 2012 of Patent Application No. 200780101452.7.

Notice of Rejection Ground dated Dec. 27, 2011 received in Japanese Patent Application No. 2009-542402.

3GPP TS 36.300 V8.2.0 (Sep. 2007) 3rd Generation Partnership Project; Technical Specifications Group Radio Access Network; Evolved Universal Terrestrial Radio Access (E-UTRA) and Evolved Universal Terrestrial Radio Access Network (E-UTRAN); Overall description; Stage 2 (Release 8).

Korean Intellectual Property Office Notice of Preliminary Rejection dated Mar. 26, 2012 issued in application No. 10-2010-7010088.

* cited by examiner

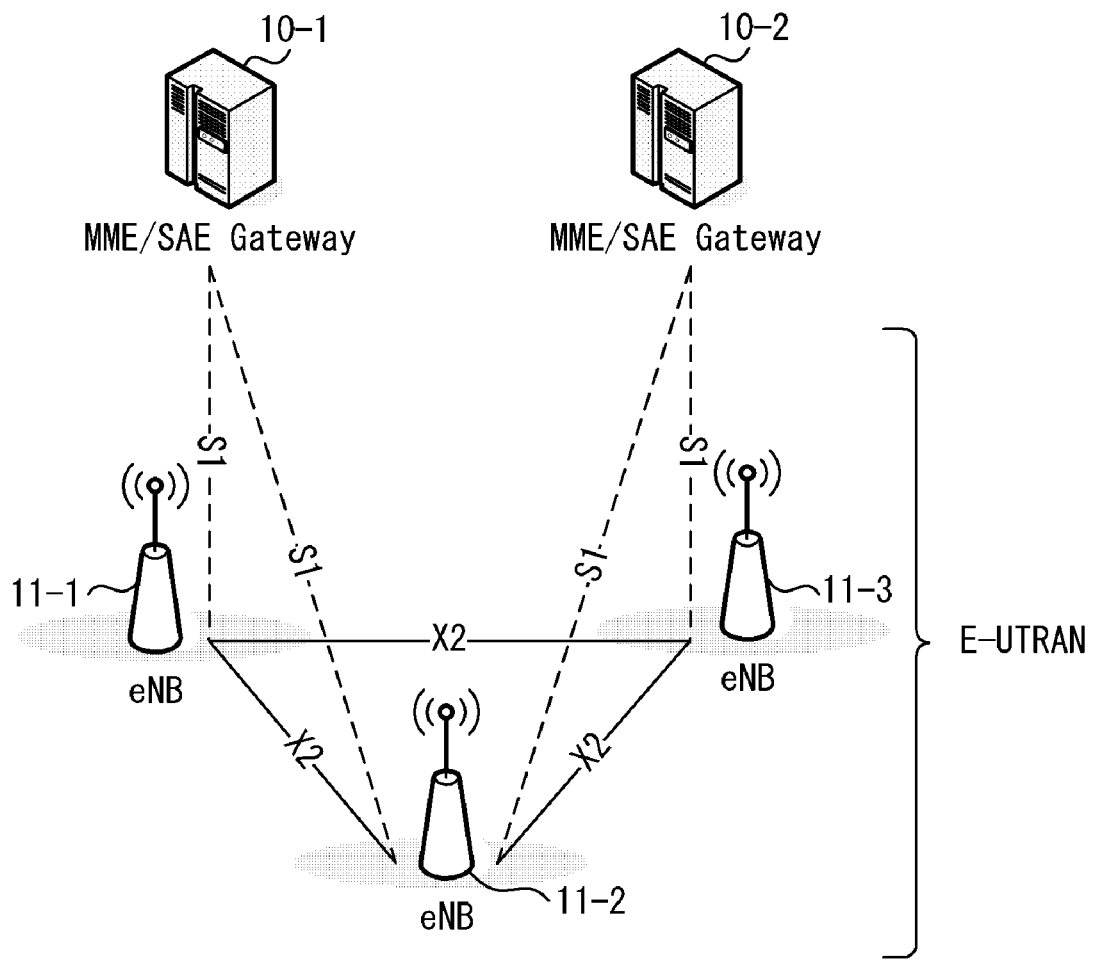
F I G. 1

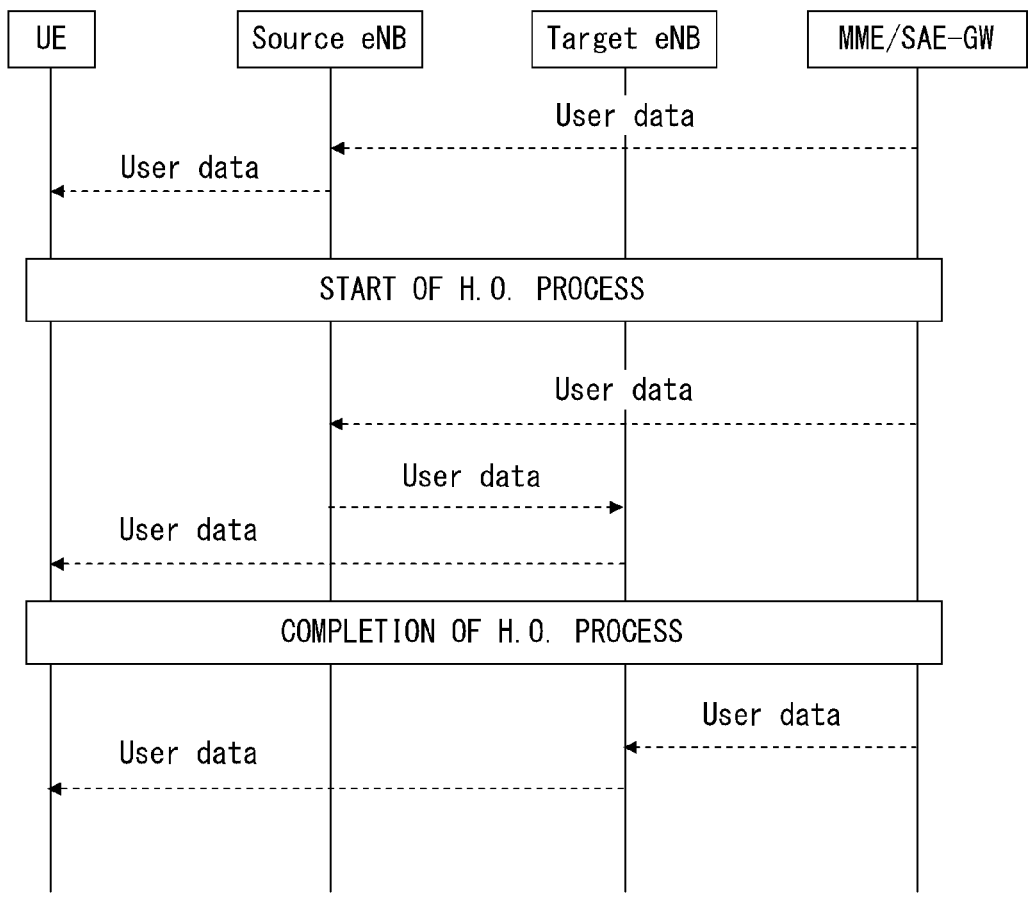
F I G. 3

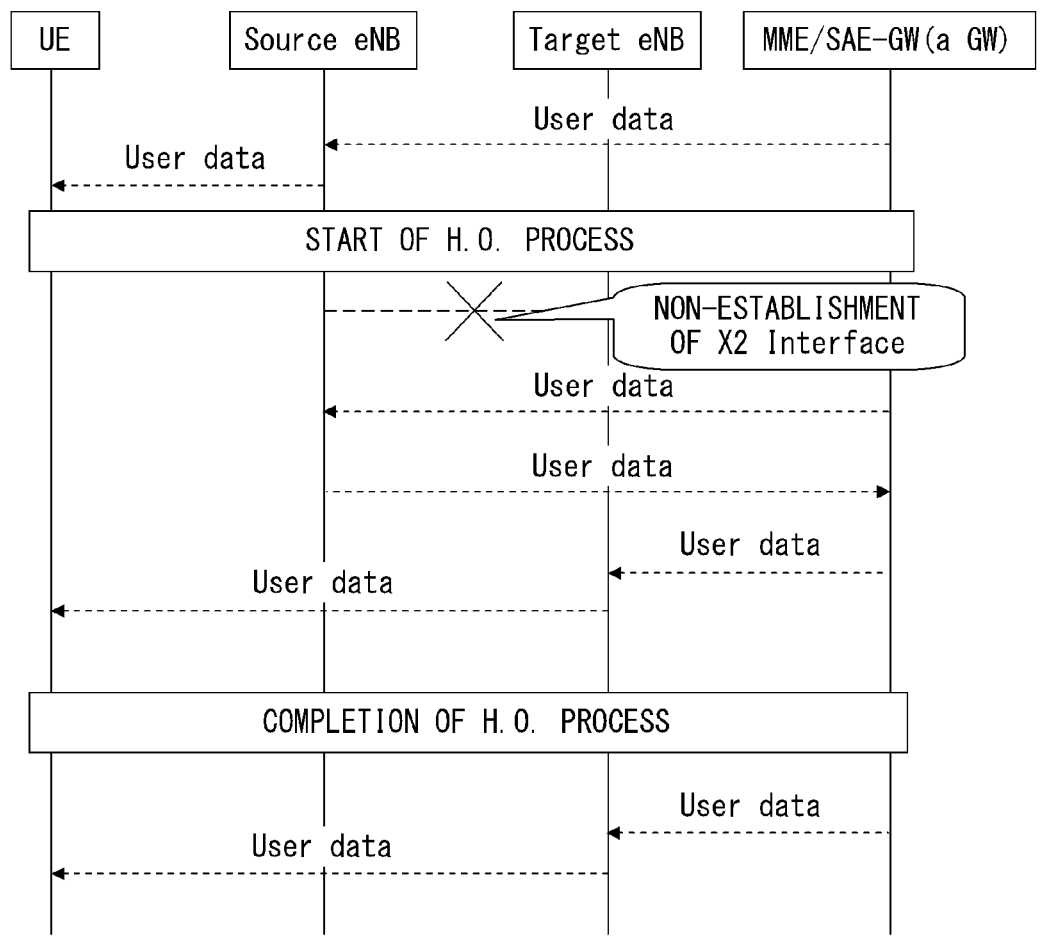
F I G. 4

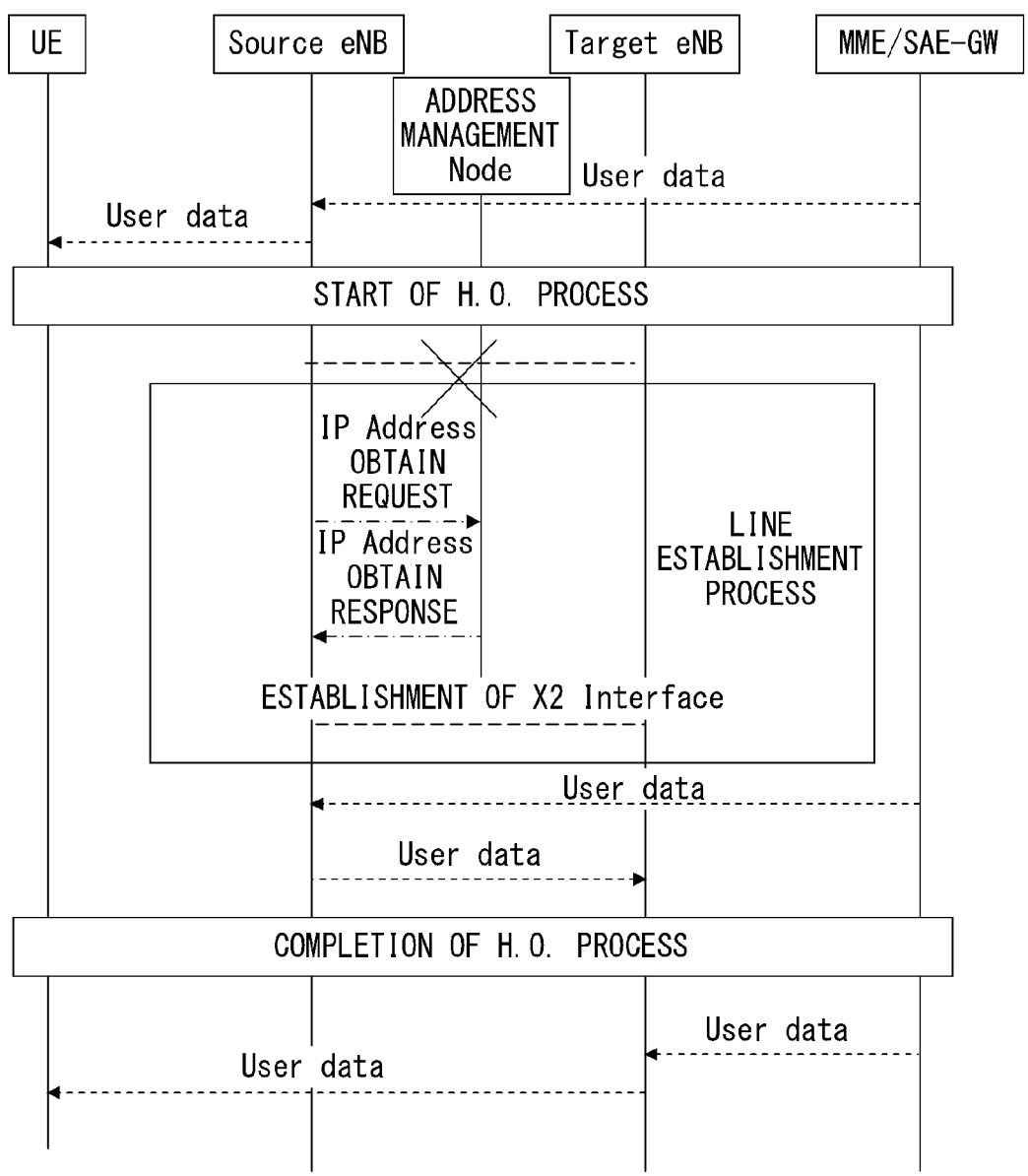
F I G. 5

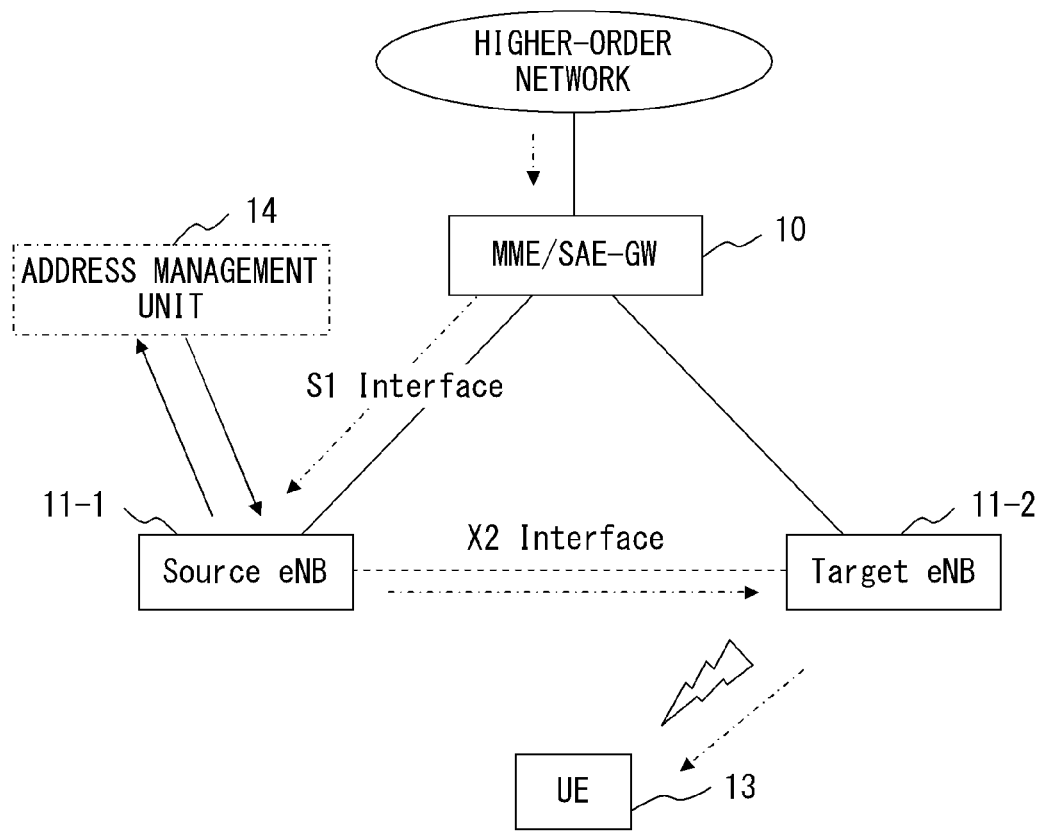
ROUTE OF USER DATA AT THE TIME OF INTER-eNB H.O.
F I G. 7

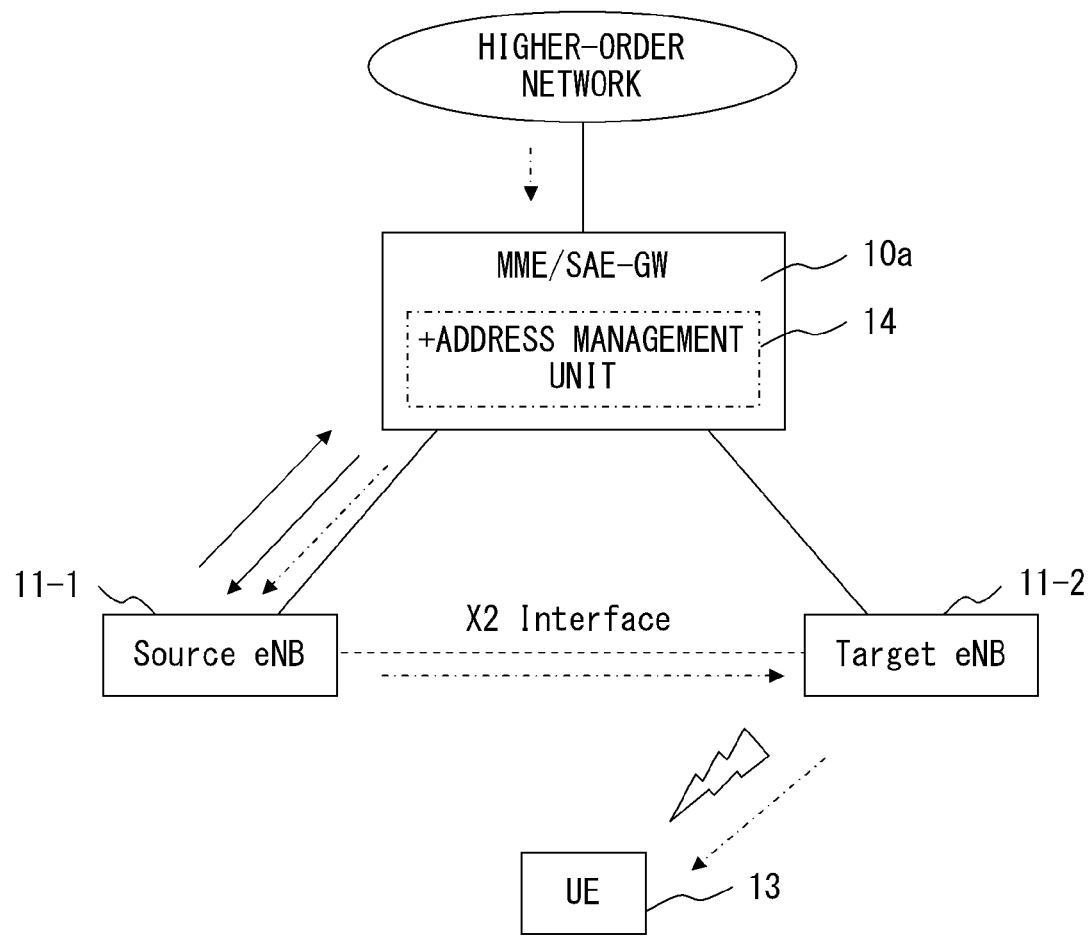
ROUTE OF USER DATA AT THE TIME OF INTER-eNB H.O.
- - - - ▶
F I G. 8

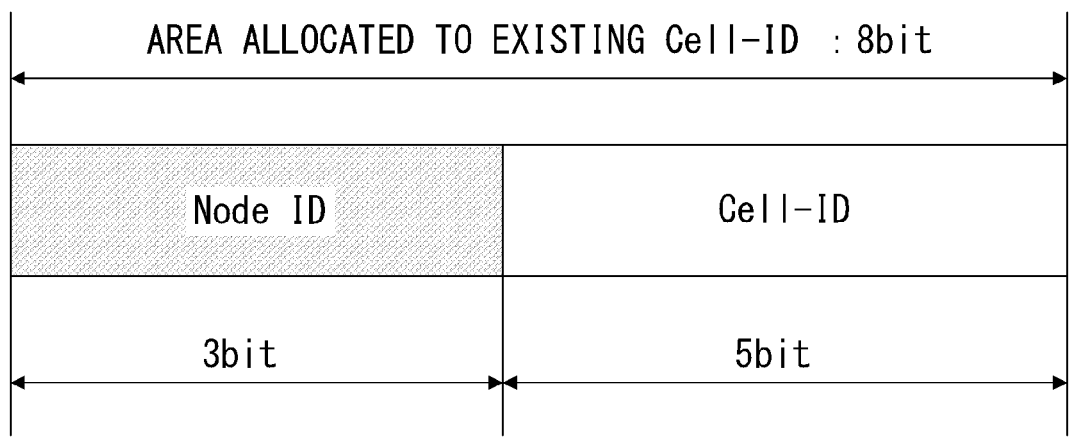
F I G. 1 0

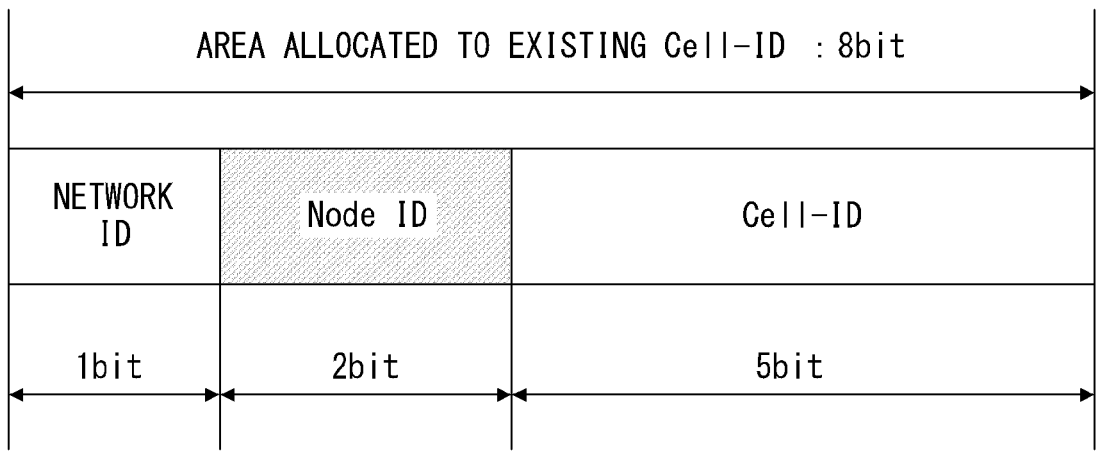
F I G. 1 1

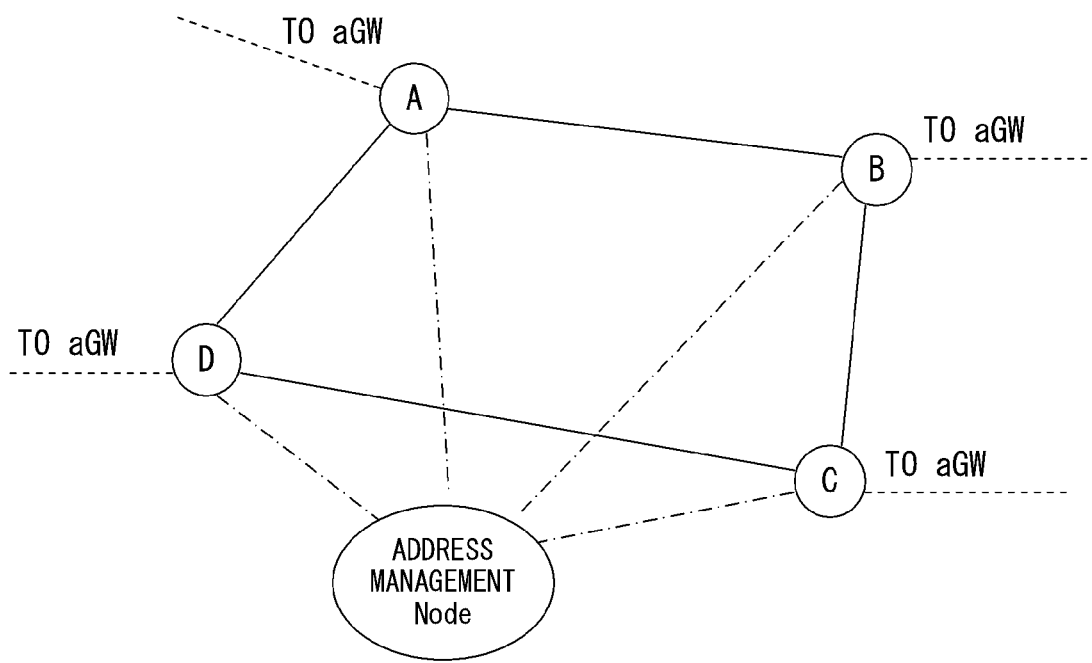
F I G. 1 3

| Node | CONNECTION TARGET Node | Node ID | DEVICE INFORMATION |
|---|---|---|---|
| A | B | 1 | bbb |
|   | D | 2 | ddd |
| B | A | 1 | aaa |
|   | C | 2 | ccc |
| C | B | 1 | bbb |
|   | D | 2 | ddd |
| D | A | 1 | aaa |
|   | C | 2 | ccc |

F I G. 1 4

| Node | CONNECTION TARGET Node | Node ID | DEVICE INFORMATION |
|---|---|---|---|
| A | B | 1 | bbb |
|   | D | 2 | ddd |
|   | E | 3 | eee |
| B | A | 1 | aaa |
|   | C | 2 | ccc |
|   | E | 3 | eee |
| C | B | 1 | bbb |
|   | D | 2 | ddd |
|   | E | 3 | eee |
| D | A | 1 | aaa |
|   | C | 2 | ccc |
|   | E | 3 | eee |

F I G. 1 6

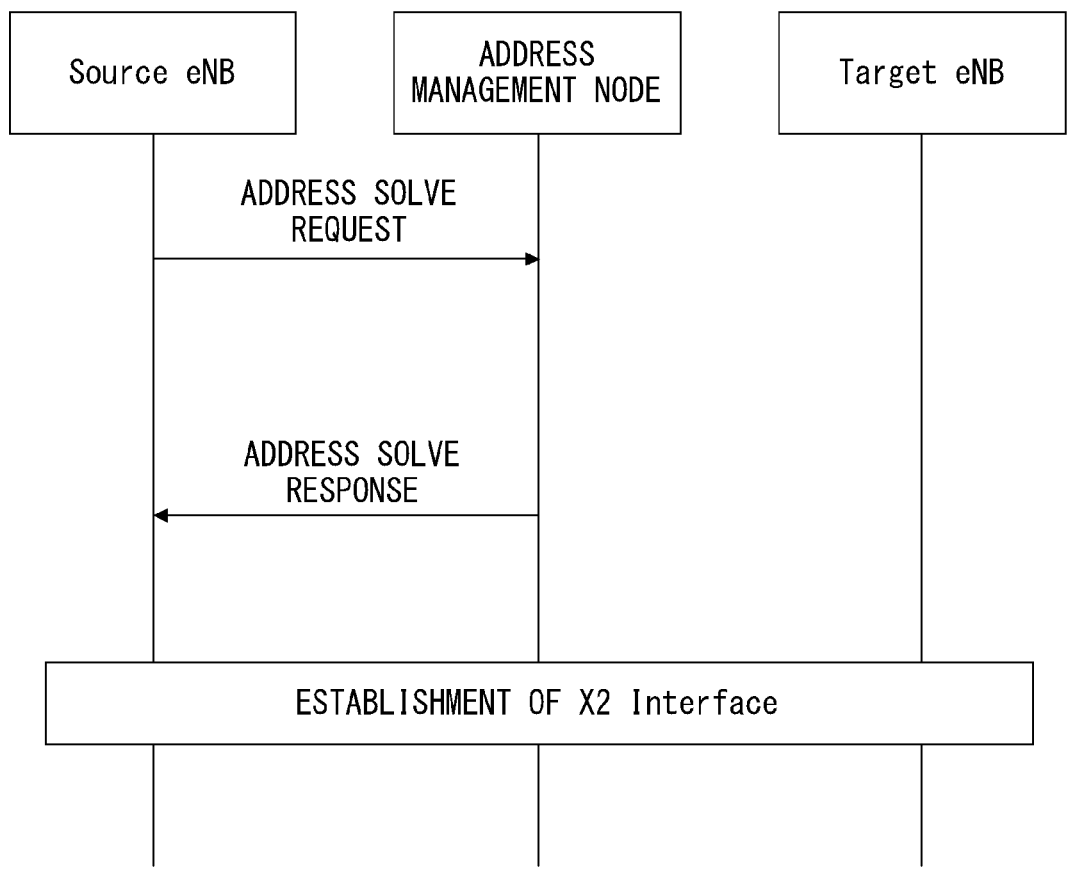
F I G. 17

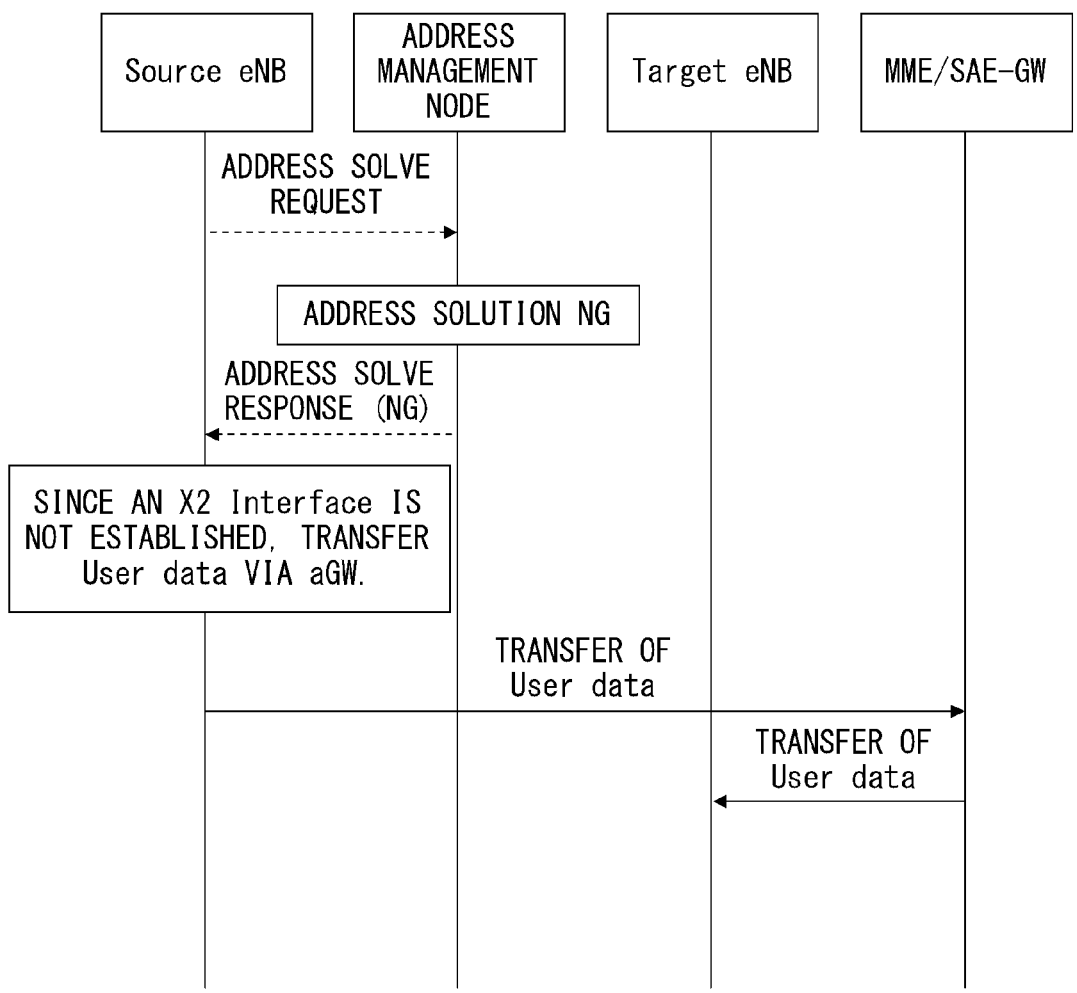
F I G. 20

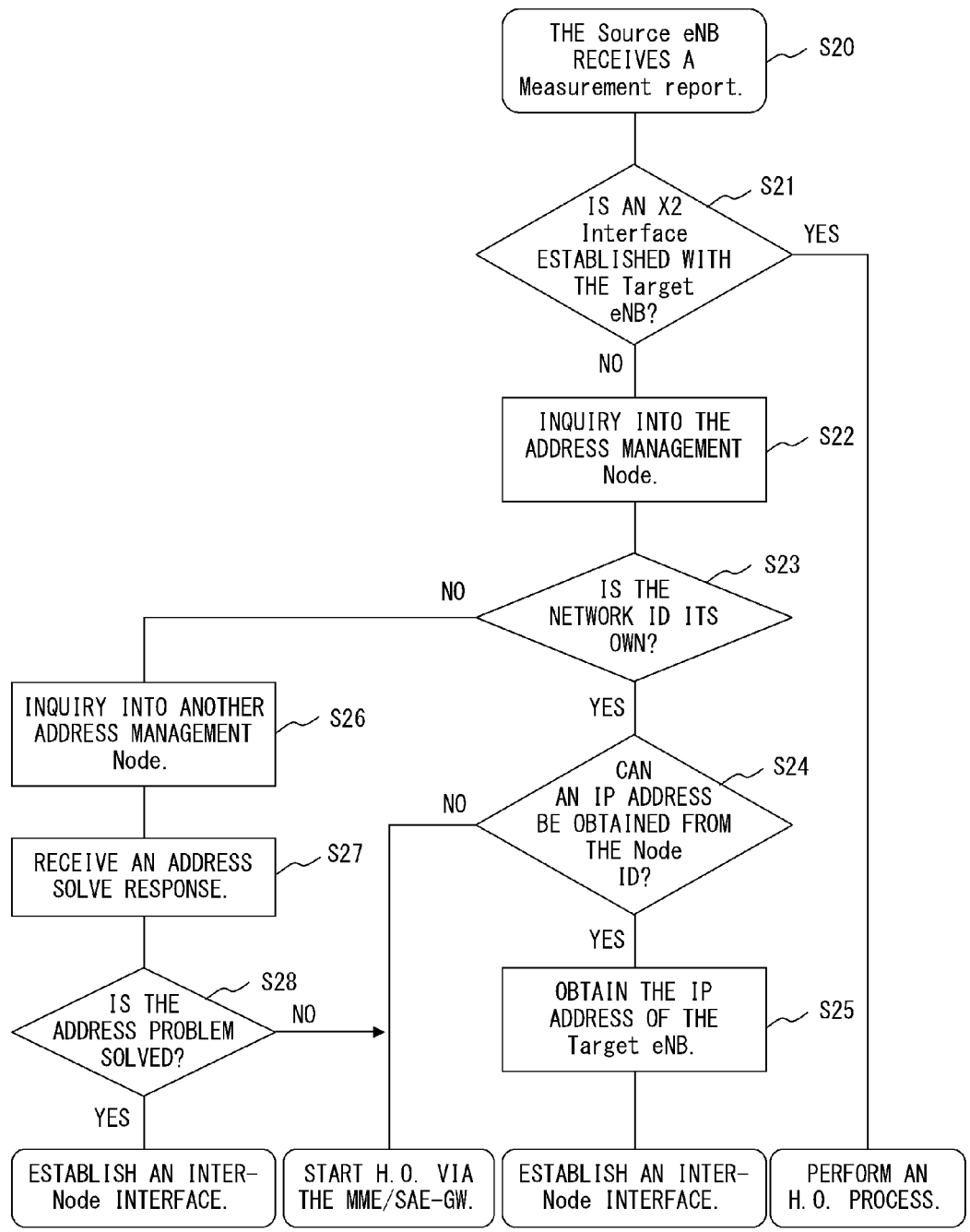
F I G. 2 2

COMMUNICATION SYSTEM

CROSS-REFERENCE TO RELATED APPLICATION

This application is a continuation application of International PCT Application No. PCT/JP2007/001251 which was filed on Nov. 19, 2007.

FIELD

The embodiment discussed herein is related to a communication system for conducting radio communications between base station devices and between a base station device and a base station control device.

BACKGROUND

In a next-generation radio mobile communication system represented by LTE (long term evolution), a radio base station device (hereinafter called "eNB") constituting the radio mobile communication system is connected to an MME/SAE-GW device (base station control device), which is its higher-order device, and another base station device using an IP transmission path.

The interfaces between eNBs and between an eNB and an MME/SAE-GW device are called "X2 interfaces" and "S1 interfaces", respectively. Interfaces between other devices are also discussed from the viewpoint of standardization (see 3GPP TR 23.882 3GPP System Architecture Evolution: Report on Technical Options and Conclusions and the like).

Although in such a system an interface between respective devices constituting a radio mobile communication system can generally be arbitrarily set at the starting time of system, its setting method is semi-fixed and it is difficult to modify it during the operation of the system. Therefore, if a mobile station device (UE) existing in the system performs a handover accompanying area movement, it is desired to prepare its handover line in advance in a system on the handover-allowing side when the handover is performed with eNBs under the control of an MME/SAE-GW device or if the handover is performed between system areas (service areas) across MME/SAE-GW devices. A handover source base station device (hereinafter called source eNB) can transfer down-link (DL) data for a mobile station, received from an MME/SAE-GW device to a handover target base station device (hereinafter called "target eNB") in units of transmission (e.g., in units of RLC-SDU) and the target eNB can transfer the received data via the handover process to a mobile station device (hereinafter called "UE"). For example, when a line with a handover source base station device is not activated yet, a handover process as described above may not be performed.

The basic configuration of eUTRA, the transmission route of user data at the time of a handover, and a sequence chart between devices at the time of a handover are illustrated in FIGS. 1, 2 and 3, respectively.

ENBs 11-1 and 11-2 and eNBs 11-2 and 11-3 are under the control of an MME/SAE gateway 10-1 and 10-2, respectively. The MME/SAE gateways 10-1 and 10-2 and the eNB 11-1 through 11-3 are connected by the S1 interface. The eNBs 11-1 through 11-3 are connected by the X2 interface. The network between the eNBs 11-1 through 11-3 is E-UTRAN.

FIG. 2 explains the transmission route of user data at the time of a handover. Firstly, it is assumed that a mobile station 13 is under the control of a source eNB 11-1. User data transmitted from a higher-order network is transferred to the source eNB 11-1 side and the user data is wirelessly transmitted from the source eNB 11-1 to the mobile station 13. Then, it is assumed that the mobile station 13 is handed over from the source eNB 11-1 to be under the control of a target eNB 11-2. Then, the source eNB 11-1 transmits the user data to the target eNB 11-2. The target eNB 11-2 transmits the received user data to the mobile station 13. In this case, interfaces between the MME/SAE gateway 10 and the source eNB 11-1/target eNB 11-2 are S1 interfaces. An interface between the source eNB 11-1 and the target eNB 11-2 is an X2 interface.

FIG. 3 is a sequence chart at the time of a handover.

Firstly, user data is transmitted from an MME/SAE gateway to a mobile station UE via a source eNB. When a handover (H.O.) is started, the user data is transferred from the source eNB to a target eNB and then is transmitted to the mobile station UE. When the handover process is completed, the mobile station UE is under the control of the target eNB and the user data is transmitted from the MME/SAE gateway to the mobile station UE via the target eNB.

It is assumed that if an H.O. request comes when, between eNBs, a source eNB does not store the IP address of a target eNB; that is, when an X2 interface is not established between eNBs, a handover is performed via an MME/SAE-GW between the source eNB and the target eNB (ex. R3-070695).

A user data transfer sequence in the case where an X2 interface is not established is illustrated in FIG. 4.

Firstly, user data is transmitted from an MME/SAE gateway to a mobile station UE via a source eNB. When a handover (H.O.) is started, the user data is transferred from the source eNB to a target eNB. However, since an X2 interface is not established between the source eNB and the target eNB, the user data is transmitted from the source eNB to the MME/SAE gateway and is transmitted to the target eNB via the MME/SAE gateway. When a handover process is completed, the user data is transmitted from the MME/SAE gateway to the mobile station UE via the target eNB.

As described above, in a handover operation accompanying the area movement of a mobile station, a H.O. process includes the transfer of user data between eNBs. It is one object of the handover process to enable UE to receive a series of user data (lossless handover) by this series of operations. However, as illustrated in FIG. 3, in order to activate a desired line when an inter-device interface is not activated, it is desired for a movement source device to recognize device information, such as an IP address, about a movement target device. Therefore, it is desired for respective devices to store respective device individual information (such as IP addresses and the like) constituting a line connection paying attention to a handover. (Alternatively, it is desired for respective devices to initially register the device information of all the component devices at the time of system activation and its extensibility is small.) However, since stored information (an IP address and the like) differs for each device and line setting between all the devices is not necessary, it becomes desired for setting/adjusting respective devices constituting a system according to an individual environment and much labor is required for an operator (for example, the design of a handover area/adjacent area and the like). Flexible correspondence to the extension of a system (the additional installment of devices and the modification of an operation form) becomes difficult.

Patent document 1 discloses a mobile telephone system for inquiring with a position information management center of the IP address of a network connection device connected to a radio base station in which a cellular phone to be called is positioned in the radio base station connected to the Internet via the network connection device and is connected to a communication line with a network connection device having the IP address.

Patent document 1: Japanese Laid-open Patent Publication No. 11-150753

Non-patent document 1: 3GPP TR 25. 912, [online], [retrieved on May 1, 2007], Internet <URL: http://www.3gpp.org/ftp/Specs/html-info/25-series.htm>

Non-patent document 2: 3GPP TS25. 331, [online], [retrieved on May 29, 2007], Internet <URL: http://www.3gpp.org/ftp/Specs/html-info/25-series htm>

Non-patent document 3: 3GPP TR23. 882, [online], [retrieved on May 29, 2007], Internet <URL: http://www.3gpp.org/ftp/Specs/html-info/23-series htm>

Non-patent document 4: 3GPP R3-070695, [online], [retrieved on May 29, 2007], Internet <URL: http://www.3gpp.org/ftp/tsg_ran/WG3_Iu//TSGR3_55bis/docs/>

SUMMARY

According to an aspect of the invention, a communication system provided with a plurality of radio base station devices wirelessly communicating with a mobile station includes an inquiry receiving unit for receiving the inquiry into the network address of a second base station device from a first radio base station device, upon the time of the mobile station under the control of the first radio base station device is handed over to the second base station device; a database unit for relating the network address of the first radio base station device to the network address of the second radio base station device, which is a handover target candidate, and storing them; and a transmitting unit for obtaining the network address of the second radio base station device from the database unit in response to the inquiry and transmitting the network address to the first radio base station device, wherein an interface is established between the first and second radio base station devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 is a basic configuration of eUTRA.

FIG. 3 is a sequence chart between devices at the time of a handover.

FIG. 4 is user data transfer sequence when an X2 interface is not established yet.

FIG. 5 is the sequence of processes according to the preferred embodiment.

FIG. 7 is a network configuration having an address management node according to the preferred embodiment.

FIG. 8 is a configuration in which an MME/SAE-GW includes an address management node unit.

FIG. 10 explains a cell-ID (No. 1).

FIG. 11 explains a cell-ID (No. 2).

FIG. 13 explains the IP focusing method of an address management node (No. 1).

FIG. 14 explains the IP focusing method of an address management node (No. 2).

FIG. 16 explains the IP focusing method of an address management node (No. 4).

FIG. 17 is an address inquiry sequence chart for the address management node.

FIG. 20 is a sequence chart in the case where an address solution response is NG.

FIG. 22 is a flowchart up to the address solution in the case of including a network ID for network identification.

DESCRIPTION OF EMBODIMENTS

The embodiments can autonomously establish an interface required by respective devices constituting a system. For example, when there is no X2 interface between eNBs, a source eNB that has obtained target eNB information from a UE by a measurement report can establish an X2 interface by accessing an address management node existing on a network and obtaining the IP address of the target eNB and can perform a handover process between the eNBs.

The sequence of processes according to the preferred embodiment is illustrated in FIG. 5.

This preferred embodiment is provided with an address management node for managing the IP addresses of respective nodes of a network. Although the function of an address management node can be provided as an independent server or provided in a source eNB, a target eNB, or an MME/SAE gateway, in the following explanation it is assumed that the function is provided as an independent server.

When user data is transmitted to a mobile station UE from an MME/SAE gateway via a source eNB, a handover process starts. When the handover process starts, although it is desired for the source eNB to transmit the user data to a target eNB, an X2 interface is not established yet and does not know the IP address of the target eNB. Therefore, the source eNB may not transmit the user data to the target eNB. Therefore, the source eNB inquires with an address management node about the IP address of the target eNB and obtains the IP address. By the source eNB obtaining the IP address, an X2 interface is established between the source target eNBs. Then, the source eNB transfers the user data to the target eNB and then performs a handover process.

When a line is not established with a target movement target device at the execution time of the handover of a mobile station, respective network devices can establish desired interfaces by inquiring with the address management node about the device information (IP address and the like) of target devices and can perform a handover process via the interfaces.

By concentrating the device information management of respective devices on one node, the load for network construction can be reduced compared with that of the case of respective devices managing their pieces of information, and even at the time of system extension, a line can be activated every handover from a mobile station only by updating the information of an individual information management node, thereby reducing the excessive load in a system design (office installation design) of an operator.

Figure 2:
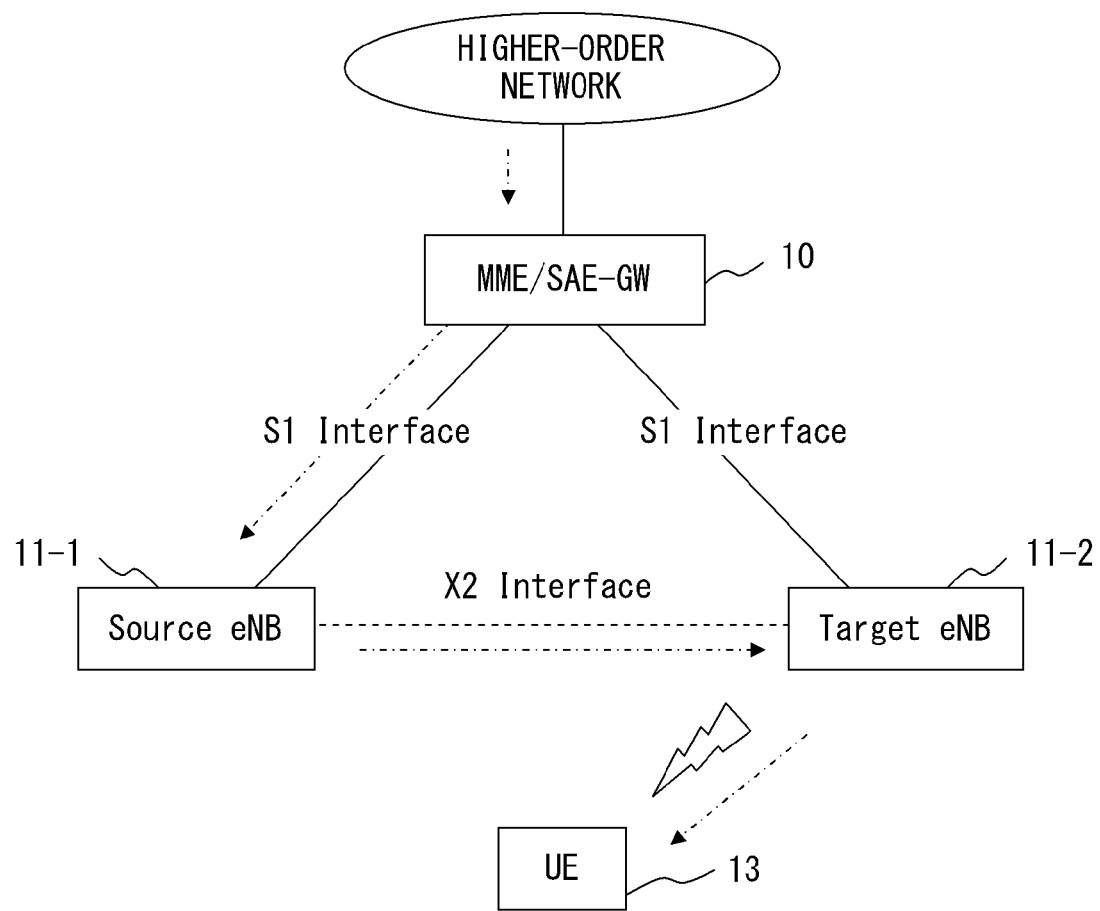
FIG. 2 illustrates the transmission route of user data at the time of a handover.
Figure 6:
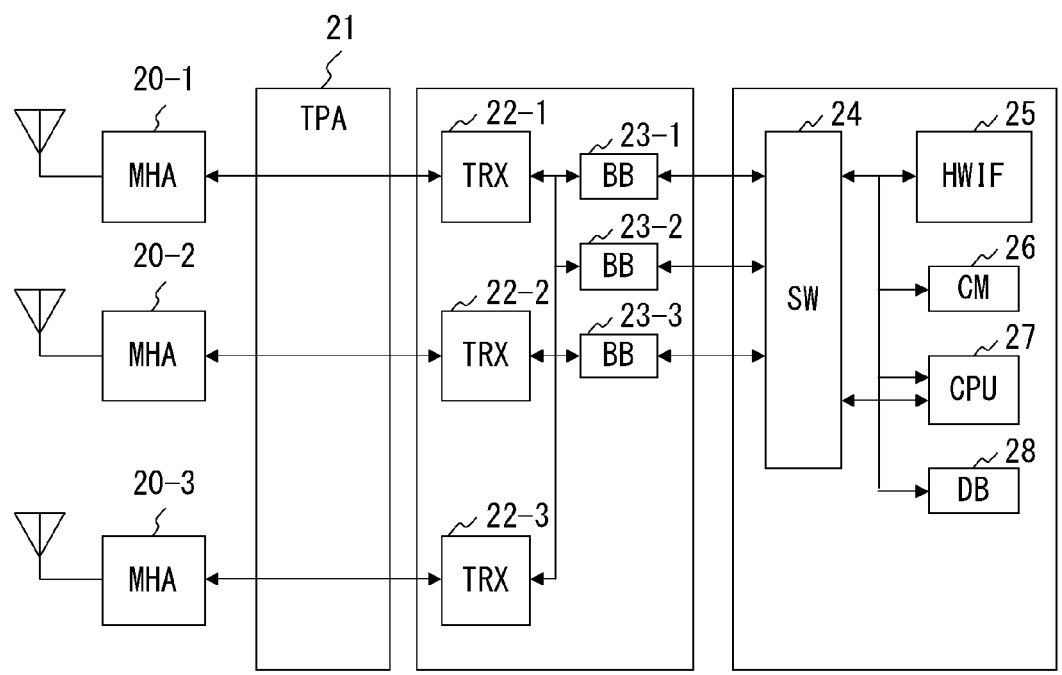
FIG. 6 is a device configuration of a radio base station device according to the preferred embodiment.

FIG. 6 is a device configuration of a radio base station device according to the preferred embodiment.

The device information (IP address, etc.) acquisition process of a target eNB is performed by a CPU 27. Mast head amplifiers 20-1 through 20-3 amplify transmitting/received signals. A transmitting power amplifier 21 amplifies transmitting signals. TRXs 22-1 through 22-3 are transmitting units. BBs 23-1 through 23-3 are baseband units. Which of the baseband units 23-1 through 23-3 data is transmitted/received to/from is switched over by a switch 24. A database 28 stores data to be stored as a radio base station device. Common memory 26 is working memory. The CPU 27 performs various processes to be performed as a radio base station device. A highway interface 25 is an interface for connection to another network device.

FIG. 7 is a network configuration having an address management node according to the preferred embodiment.

When a mobile station 13 is handed over from being under the control of a source eNB 11-1 to being under the control of a target eNB 11-2, the source eNB 11-1 inquires with an address management unit 14 about the IP address of the target eNB 11-2 and obtains the IP address. An X2 interface is established between the source and target eNBs 11-1 and 11-2 according to the obtained IO address and user data is transferred from the source eNB 11-1 to the target eNB 11-2.

This function to manage addresses exists not only as an independent node but can also be provided for an MME/SAE-GW, another ENB, and another system component device as a function unit.

FIG. 8 is a configuration in the case where an MME/SAE-GW includes an address management node unit.

When a mobile station 13 is handed over from being under the control of a source eNB 11-1 to being under the control of a target eNB 11-2, the source eNB 11-1 inquires with an address management unit 14 about the IP address of the target eNB 11-2 and obtains the IP address. An X2 interface is established between the source and target eNBs 11-1 and 11-2 according to the obtained IO address and user data is transferred from the source eNB 11-1 to the target eNB 11-2.

Figure 9:
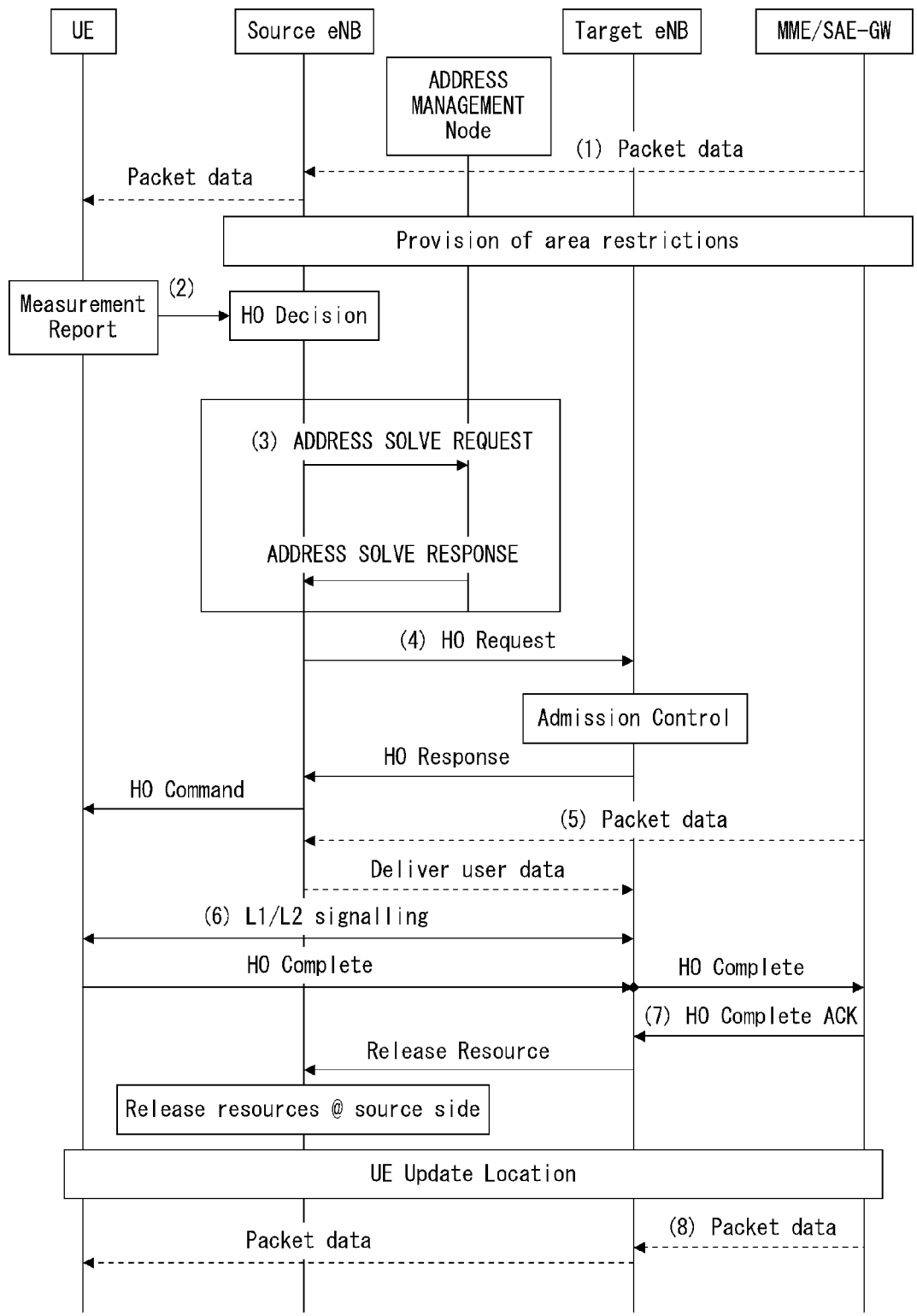
FIG. 9 is a sequence chart of a handover in an MME/SAE-GW and between eNBs, using this preferred embodiment.

FIG. 9 is a sequence chart of a handover in an MME/SAE-GW and between eNBs, using this preferred embodiment.

(1) through (8) of the handover sequence will be explained.

(1) State before H.O.: Packet data transmitted from an MME/SAE-GW is transmitted to a UE via a source eNB.

(2) The UE collects information obtained from near-by eNBs and transmits a measurement report to the source eNB. The measurement report is a report from the UE to a radio base station office regulated in 3GPP TS 25.331 in which information about the intensity state of an electric wave sensed by a mobile state and the like are described. This piece of information is used to determine whether a handover should be performed.

At this moment, respective eNBs including a target eNB transmit their individual identification IDs capable of specifying their own eNB to the UE. In this preferred embodiment it is assumed that the area of a cell-ID is used and a new parameter is added without increasing a data area.

Upon receipt of the measurement report from the UE the source eNB obtains information necessary for H.O. from the content of the report, including the above information.

(3) The source eNB determines whether an X2 interface is established with the target eNB being the H.O. target of the UE. If no X2 interface is established, the source eNB transmits an address solve request to the address management node in order to obtain an IP address that is the device information of the target eNB.

This request stores a node ID, which is the individual identification ID of the target eNB previously obtained from the UE. Sometimes a network ID is attached as an option. Upon receipt of this request, the address management node solves the IP address of the target eNB based on this piece of information.

The address management node stores a database related to the node IDs and the device information of respective eNBs and has a function to retrieve the device information of the eNB using a received key as a key. The address management node can focus retrieval targets only on eNBs which have a possibility that a UE can hand them over, based on the device information of a source eNB that has requested an address solution.

In an LTE system to which the embodiment is applied, the address management node stores a database in which node IDs and the IP addresses of respective eNBs are corresponded using device information as an IP address. By focusing on a retrieval target using the IP address of a source eNB included in an address solve request, node IDs can be overlapped and the amount of data can be suppressed to a low level.

If a response is NG when an inquiry is made with the address management node, user data is transferred via an MME/SAE-GW instead of establishing an X2 interface between source and target eNBs.

The source eNB receives an address solve response from the address management node and obtains the IP address of the target eNB. Thus, an X2 interface, which is a handover line, is established between source and target eNBs.

(4) The source eNB transmits an H.O. request to the target eNB and by receiving an H.O. response from the target eNB, the UE obtains information necessary for H.O. By transmitting an H.O. command to the UE, the source eNB notifies the target eNB of information necessary for connection.

(5) Packet data to be forwarded from the MME/SAE-GW to the UE is transmitted to the source eNB. At this moment, the source eNB transfers the packet data received from the MME/SAE-GW from the source eNB to the target eNB, using the X2 interface established by (3).

(6) The UE applies H.O. to the target eNB and, after the process is completed, transmits H.O. complete to the target eNB. Upon receipt of "H.O. complete", the target eNB transmits the H.O. complete to the MME/SAE-GW.

Upon receipt of "H.O. complete", the MME/SAE-GW switches over the transmission target of the packet data from the source eNB to the target eNB and transmits "H.O. complete ACK" to the target eNB.

(7) Upon receipt of "H.O. complete ACK", the target eNB transmits "release resource" to the source eNB and releases a packet-data storage buffer for target eNBs in the source eNB.

(8) State after H.O. completion: The packet data transmitted from the MME/SAE-GW is transmitted to the UE via the source eNB.

FIGS. 10 and 11 explain a cell-ID.

Currently, a value regulated in a cell-ID can be expressed by 8 bits. However, its actually used range is very narrow and a cell-ID can be expressed by a value of less than the regulated number of bits. FIG. 10 is a usage example of a cell-ID area. However the number of bits is one example.

Furthermore, a network identification ID "network ID" can be attached as an option. FIG. 11 is a cell-ID area in the case where a network ID is applied.

In this preferred embodiment, an area applied to a existing cell-ID, which is considered in an LTE, is divided into a network ID, which is an individual identification ID, a node ID and a cell-ID, and is used. The network ID and the node ID will be explained below.

Network ID

A network ID is an ID for identifying the network in a next-generation radio communication network. The address management node determines whether the address management node can make an inquiry, using this ID.

Furthermore, in the next-generation radio communication network, since an H.O. between a WLAN and a 3GPP network is also anticipated, whether H.O. is performed in the LTE or whether it is H.O. with a node belonging to another network can be distinguished using this ID.

Figure 12:
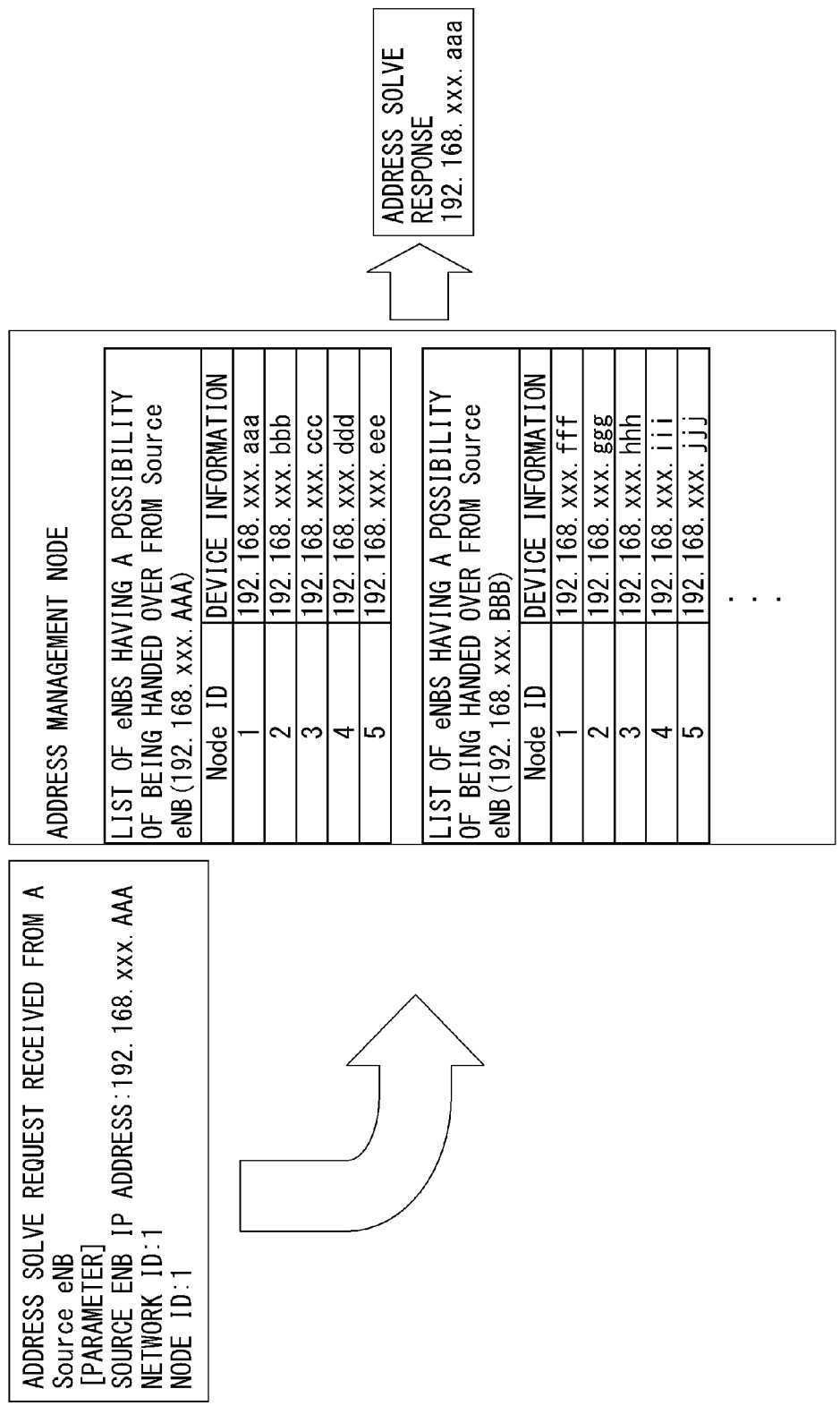
FIG. 12 is one example of an address table owned by the address management node.

FIG. 12 is one example of an address table owned by the address management node.

The address management node registers the IP addresses of eNBs having a possibility of being handed over, from among the IP addresses of respective source eNBs. The IP addresses of eNBs, registered as device information, are corresponded to node IDs and are registered. An address solve request received from a source eNB has parameters of the IP address of a source eNB, a network ID and a node ID, and returns the IP address of a handover target device to an address solve request source as an address solve response with reference to a table, as illustrated in FIG. 12.

FIGS. 13 through 16 explain the IP focusing method of an address management node.

In FIG. 13 an address management node is connected to respective eNBs A, B, C and D. FIG. 14 is a "list of eNBs having a H.O. possibility" which exists in the address management node when the address management node is connected in FIG. 13.

According to FIG. 14, the connection target nodes of node A are nodes B and D. Nodes IDs are attached to the respective nodes, are related to respective pieces of device information, and are managed.

Figure 15:
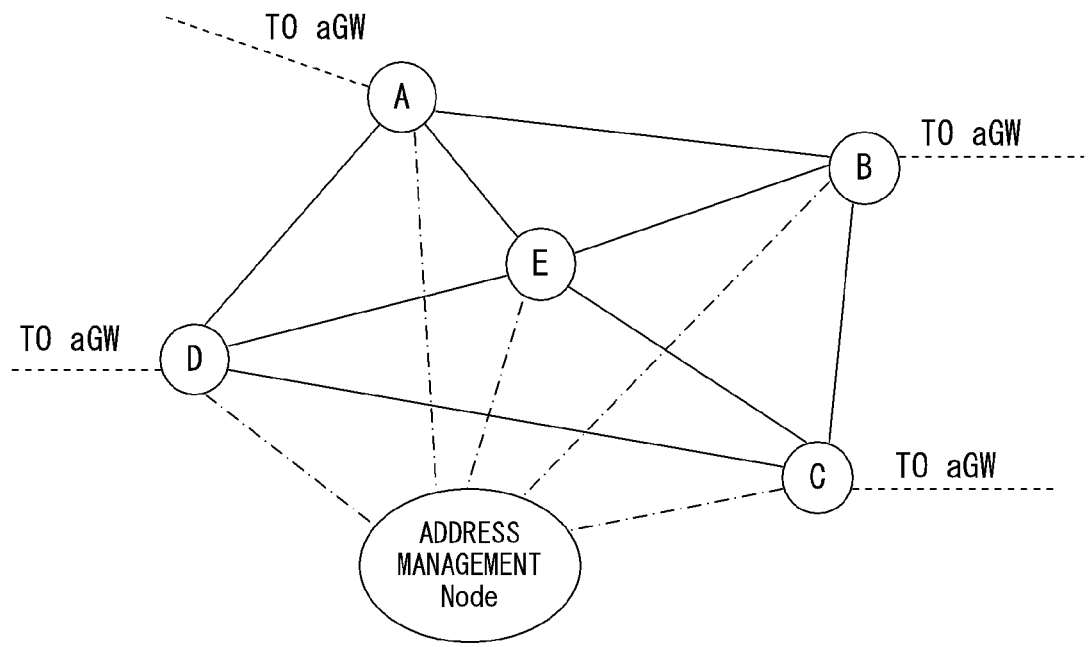
FIG. 15 explains the IP focusing method of an address management node (No. 3).

When a node E is newly disposed on the network illustrated in FIG. 13 and the nodes are configured as illustrated in FIG. 15, it is desired to update the "list of eNBs having an H.O. possibility" which exists in the address management node, to the list illustrated in FIG. 16.

The node E added to the network can be recognized in the respective tables of nodes A through D as a connection target.

The above is performed by the network manager manually updating the table of the address management node.

FIG. 17 is an address inquiry sequence chart for the address management node.

The source eNB transmits an address solve request to the address management node (node) and receives an address solve response from the address management node. Since the source eNB can know the IP address of the target eNB in this way, the source eNB can establish an X2 interface.

If there is no combination of the node ID and an IP address in its own database when a network ID is attached to a cell-ID allocation area as an option and IP address retrieval is performed in the address management, an inquiry with another address management node is made possible.

Figure 18:
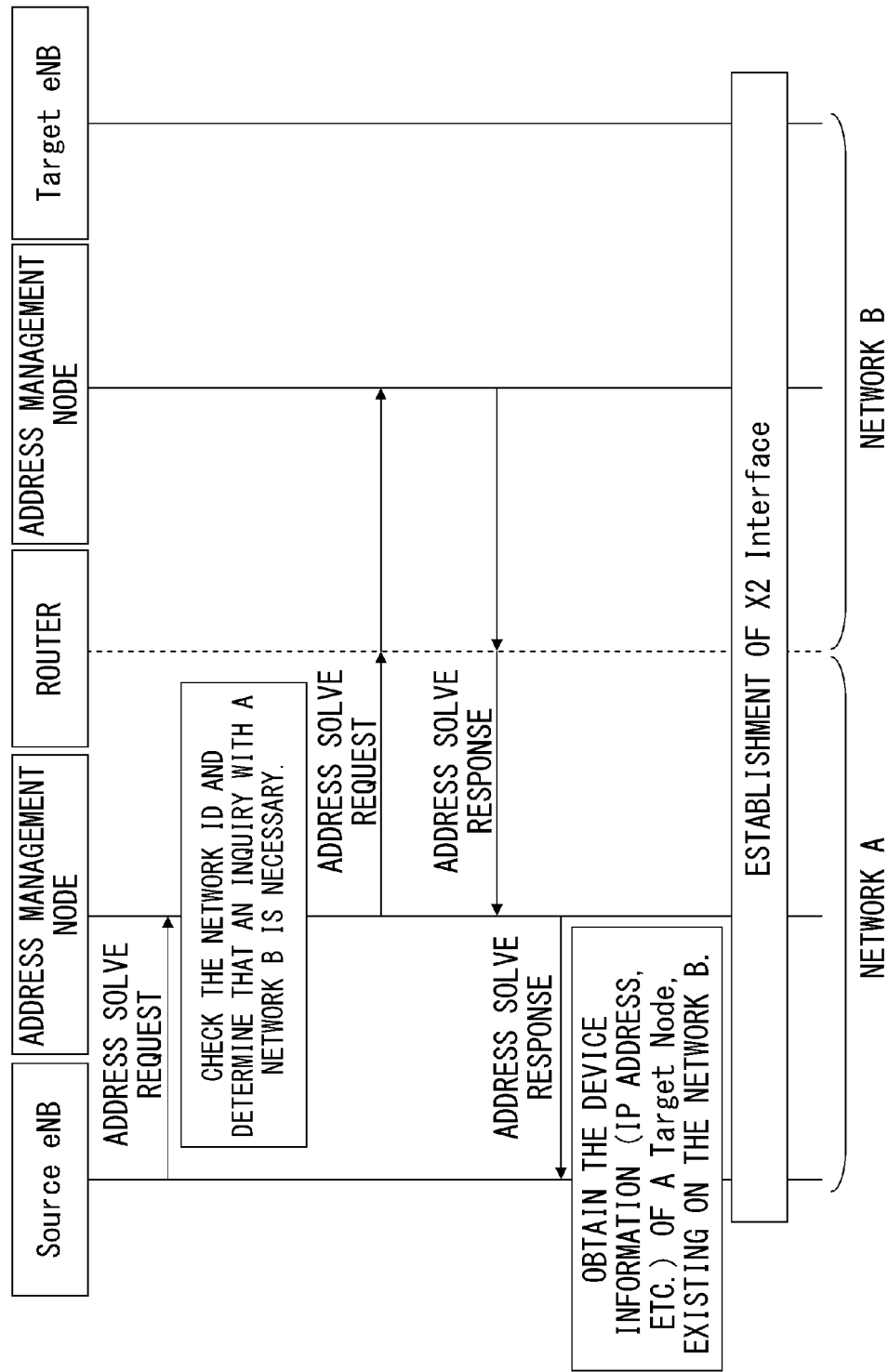
FIG. 18 is an address inquiry sequence chart for the address management node of another network.

FIG. 18 is an address inquiry sequence chart for the address management node of another network.

In FIG. 18 it is assumed that different networks A and B are connected by a router, for convenience' sake. A source eNB issues an address solve request to the address management node of its own network (network A). The address management node checks its network ID and determines that an inquiry with a network B is necessary. Then, the address management node of the network A issues an address solve request to the address management node of the network B. When the address management node of the network B returns an address solve response to the address management node of the network A, the address management node of the network A transfers this to the source eNB. Thus, the source eNB obtains the device information (IP address and the like) of a target eNB existing on the network B and establishes an X2 interface between the source and target eNBs.

Protocol establishment sequencing for connecting between nodes can similarly be done using this method.

Although the embodiment has so far been studied based on a radio communication system based on a 3GPP network, the embodiment is also applicable to another radio communication system, such as one based on a WiMAX network and the like.

Figure 19:
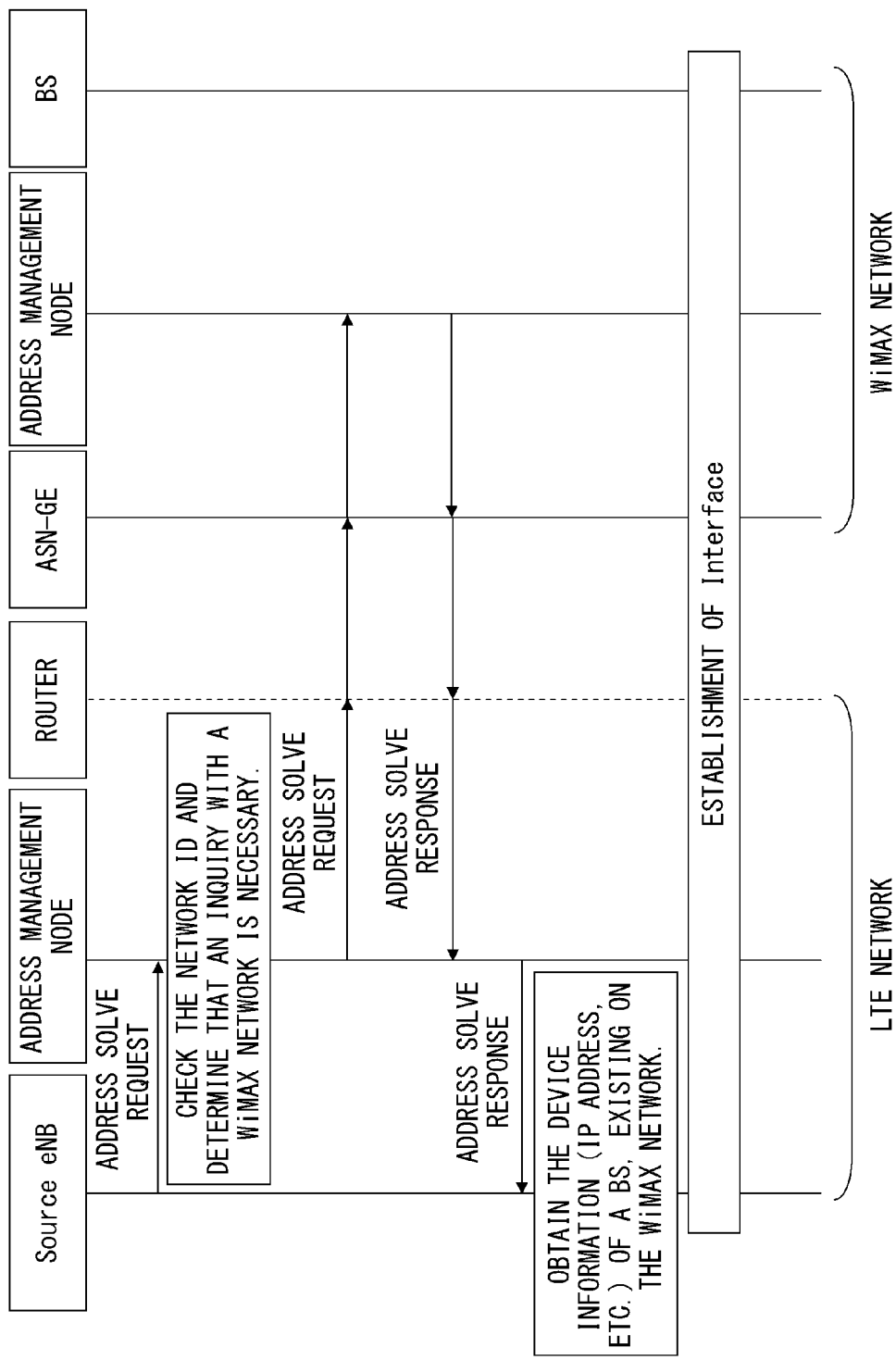
FIG. 19 is an establishment sequence chart of an interface across a WiMAX network and a 3GPP network (LTE network).

FIG. 19 is a sequence chart for establishing an interface across a WiMAX network and a 3GPP network (LTE network).

In this case, ASN-GW and BS (base station) are devices provided with an AAA (roaming manager) function, a mobility (hand-off manager) function, and a mobile IP foreign agent function on a radio network and a radio base station device on a WiMAX network, respectively.

In this case, the address management node disposed on an LTE network establishes an interface between a source eNB and BS by enabling the address management node to communicate with the address management node disposed on a WiMAX network across networks.

Although respective address management nodes existing in the LTE and WiMAX networks perform a connection sequence between the address management nodes, at this moment an address solution is possible while the existing device configuration of an ASN-GW is left as it is without any influence acting on it when the ASN-GW is passed through.

The source eNB issues an address solve request to the address management node of its own network (LTE network). The address management node checks its network ID and determines that an inquiry with a WiMAX network is necessary. Then, the address management node of the LTE network issues an address solve request to the address management node of the WiMAX network. When the address management node of the WiMAX network returns an address solve response to the address management node of the LTE network, the address management node of the LTE network transfers this to the source eNB. Thus, the source eNB obtains the device information (IP address and the like) of the BS existing on the WiMAX network and establishes an interface between the source eNB and the BS.

FIG. 20 is a sequence chart in the case where an address solution response is NG.

Although a source eNB transmits an address solve request to an address management node, an address solution becomes NG in the address management node. Therefore, the source eNB receives an address solve response of "NG". Thus, the source eNB may not establish an X2 interface with a target eNB and may not transmit user data. Therefore, the source eNB transmits the user data to the target eNB via an MME/SAE gateway (aGW).

Figure 21:
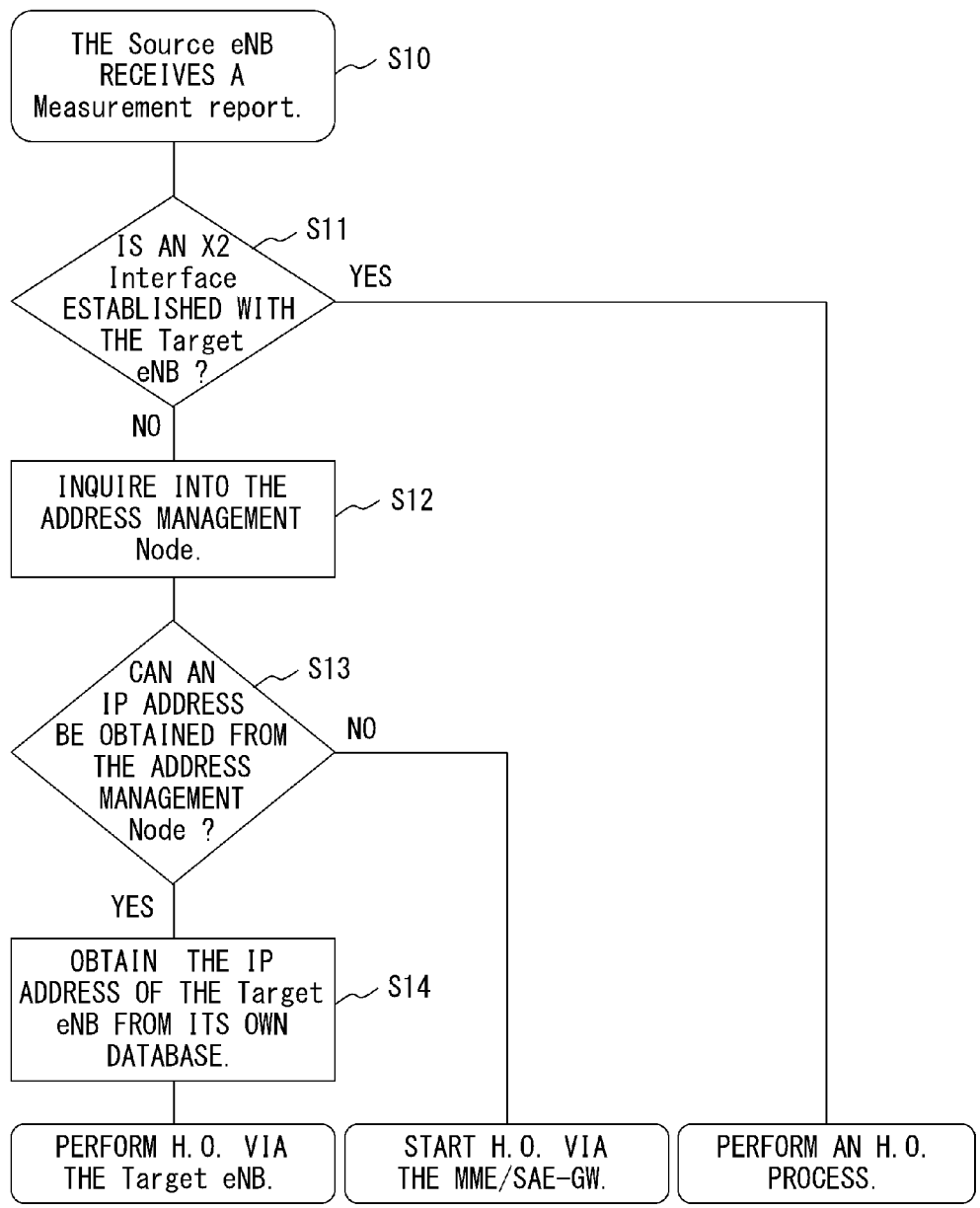
FIG. 21 is a flowchart up to the address solution of a source eNB.

FIG. 21 is a flowchart up to the address solution of a source eNB.

In step S10 a source eNB receives a measurement report. In step S11, the source eNB determines whether an X2 interface is established between the source eNB and a target eNB. If the determination in step S11 is Yes, the source eNB performs a handover process. If the determination in step S11 is No, in step S12, the source eNB requests an address solution of an address management node. In step S13, the source eNB determines whether it can obtain its IP address from the address management node. If the determination in step S13 is No, the source eNB performs a handover via the MME/SAE gateway by transmitting user data. If the determination in step S13 is Yes, in step S14, the source eNB obtains the IP address of the target eNB from its own database and performs a handover by transmitting the user data via the target eNB.

FIG. 22 is a flowchart up to the address solution in the case of including a network ID for network identification.

In step S20, a source eNB receives a measurement report. In step S21, the source eNB determines whether an X2 interface is established between the source eNB and a target eNB. If the determination in step S21 is Yes, the source eNB performs a handover process. If the determination in step S21 is No, in step S22 the source eNB makes an inquiry with an address management node. In step S23, the source eNB determines whether a network ID set in an address solve response received from the address management node is that of its own network. If the determination in step S23 is Yes, in step S24 the source eNB determines whether it can obtain its IP address from a node ID. If the determination in step S24 is No, the source eNB performs a handover process via an MME/SAE gateway. If the determination in step S24 is Yes, in step S25 the source eNB obtains the IP address of the target eNB from the table of the address management node and establishes an interface between the source and target eNBs. If the determination in step S23 is No, in step S26 the source eNB makes an inquiry with the address management node of another network. In step S27, the source eNB receives an address solve response. In step S28, the source eNB determines whether the address problem is solved. If the determination in step S28 is Yes, the source eNB establishes an inter-node interface between the source and target eNBs. If the determination in step S28 is No, the source eNB starts a handover process via the MME/SAE gateway.

According to the above preferred embodiments, an X2 interface can be established by inquiring about the IP address of a target eNB of an address management node, thus transferring user data via an X2 interface.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A communication system provided with a mobile station and a plurality of radio base station devices, comprising:
   an inquiry receiving unit to receive an inquiry about a network address of a second radio base station device from a first radio base station device, upon a time of a mobile station under the control of the first radio base station device is handed over to the control of the second radio base station device as a trigger and when an interface between the first radio base station and the second radio base station was not established;
   a memory to correspond a network address of the first radio base station device to a network address of the second radio base station device, which is a handover target, and to store the correspondence; and
   a transmitting unit to obtain a network address of the second radio base station device from the database unit based on the inquiry and transmitting the obtained network address to the first radio base station device, wherein
   the first radio base station device establishes an interface with the second radio base station device.

2. The communication system according to claim 1, wherein
   the inquiry includes identifiers of the second radio base station device.

3. The communication system according to claim 1, wherein
   the inquiry includes identifiers of a network to which the second radio base station device belongs.

4. The communication system according to claim 1, wherein
   the inquiry includes network addresses of the first radio base station device.

5. The communication system according to claim 1, wherein
   the database unit stores a table containing identifiers and network addresses of the second radio base station device, which is a handover target candidate, for each network address of the first radio base station device, and identifiers of the second radio base station device are overlapped between different tables.

6. The communication system according to claim 1, wherein
   when a network to which the first radio base station device belongs and a network to which the second radio base station device belongs differ, a request for transmitting a network address of the second radio base station device to a communication system to which the second radio base station device belongs is made.

7. The communication system according to claim 1, wherein the inquiry is made when an interface is not established between the first radio base station device and the second radio base station device.

8. A communication apparatus, comprising:
   an inquiry receiving unit to receive an inquiry about a network address of a second radio base station device from a first radio base station device, upon a time of a mobile station under the control of the first radio base station device is handed over to the control of the second radio base station device as a trigger and when an interface between the first radio base station and the second radio base station was not established;
   a memory to correspond a network address of the first radio base station device to a network address of the second radio base station device, which is a handover target, and to store the correspondence; and
   a transmitting unit to obtain a network address of the second radio base station device from the database unit based on the inquiry and transmitting the obtained network address to the first radio base station device, wherein
   the first radio base station device establishes an interface with the second radio base station device.

9. The communication apparatus according to claim 8, wherein
   when the communication apparatus may not obtain a network address of the second radio base station device, the first radio base station device and the second radio base station device communicate with each other via a base station control device.

10. A control method in a communication system provided with a database unit to correspond a network address of the first radio base station device to a network address of the second radio base station device, which is a handover target, and to store the correspondence, the control method comprising:

receiving an inquiry about a network address of a second radio base station device from a first radio base station device, upon a time of a mobile station under the control of the first radio base station device is handed over to the control of the second radio base station device as a trigger and when an interface between the first radio base station and the second radio base station was not established;

obtaining a network address of the second radio base station device from the database unit based on the inquiry and transmitting the obtained network address to the first radio base station device; and establishing an interface between the first radio base station device and the second radio base station device.

11. The control method according to claim 10, wherein when a network address of the second radio base station device may not be obtained, the first radio base station device and the second radio base station device communicate with each other via a radio base station control device.

12. The control method according to claim 10, wherein the inquiry is made when an interface is not established between the first radio base station device and the second radio base station device.

13. The control method according to claim 12, wherein when the second radio base station belongs to a network different from a network to which the communication system belongs, an inquiry is made with another communication system belonging to the different network.

14. A radio communication system comprising a first base station, a second base station, a management device, and a mobile station, wherein the mobile station transmits to the first base station a measurement result report in which information about an intensity state of an electric wave obtained from the second base station is associated with identification information that specifies the second base station, when a handover of the mobile station to the second base station is to be performed but a device-to-device connection between the second base station and the first base station is not established, the first base station sends an inquiry to the management device about address information for establishing the device-to-device connection between the second base station and the first base station by using the identification information that specifies the second base station, which is included in the measurement result report from the mobile station, the management device has a storage unit in which identification information that specifies a base station device is associated with address information of the base station device, and provides the first base station with address information corresponding to the identification information that specifies the second base station in response to the inquiry from the first base station device, the first base station transfers data addressed to the mobile station to the second base station through the device-to-device connection with the second base station by using the address information provided from the management device, and when a handover to the second base station is performed, the mobile station receives from second base station data transferred from the first base station to the second base station.

15. A first base station in a radio communication system including the first base station, a second base station, a management device, and a mobile station, the first base station comprising:

a measurement result receiving unit to receive from the mobile station a measurement result report in which information about an intensity state of an electric wave obtained from the second base station is associated with identification information that specifies the second base station, an inquiry unit to send an inquiry to the management device about address information for establishing a device-to-device connection between the second base station and the first base station by using the identification information that specifies the second base station, which is included in the measurement result report from the mobile station, when a handover of the mobile station to the second base station is to be performed but the device-to-device connection between the second base station and the first base station is not established, an inquiry result receiving unit to receive from the management device address information of the second base station corresponding to identification information that specifies the second base station in response to the inquiry, and a transferring unit to transfer data addressed to the mobile station to the second base station through the device-to-device connection with the second base station by using the address information of the second base station received from the management device.

* * * * *